(12) United States Patent
Kogure et al.

(10) Patent No.: US 7,075,011 B1
(45) Date of Patent: Jul. 11, 2006

(54) CONTINUOUS POWER SUPPLY DEVICE

(75) Inventors: Naoto Kogure, Shizuoka (JP); Hironori Ochiai, Aichi (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/311,284

(22) Filed: Dec. 20, 2005

(30) Foreign Application Priority Data

Dec. 22, 2004 (JP) .............................. 2004-371182

(51) Int. Cl.
*H01B 7/00* (2006.01)
*H02G 3/04* (2006.01)

(52) U.S. Cl. .................................... 174/72 A; 174/135

(58) Field of Classification Search ............... 174/68.1, 174/68.3, 69, 72 A, 97–99 R, 135; 191/22 R, 191/23 R; 248/629; 296/149, 152, 155
See application file for complete search history.

(56) References Cited

U.S. PATENT DOCUMENTS

| | | | |
|---|---|---|---|
| 6,570,093 B1 * | 5/2003 | Doshita et al. | 174/72 A |
| 6,575,760 B1 * | 6/2003 | Doshita et al. | 174/72 A |
| 6,603,076 B1 * | 8/2003 | Doshita et al. | 174/72 A |
| 6,723,923 B1 * | 4/2004 | Tsukamoto | 174/72 A |
| 6,724,613 B1 * | 4/2004 | Doshita et al. | 174/72 A |
| 6,791,032 B1 * | 9/2004 | Doshita et al. | 174/135 |
| 6,793,259 B1 * | 9/2004 | Sano et al. | 296/155 |
| 6,809,264 B1 * | 10/2004 | Watanabe et al. | 174/72 A |
| 6,811,404 B1 * | 11/2004 | Doshita et al. | 174/72 A |
| 6,818,827 B1 * | 11/2004 | Kato et al. | 174/72 A |
| 6,903,274 B1 * | 6/2005 | Aoki et al. | 174/72 A |
| 6,906,262 B1 * | 6/2005 | Fujimura | 174/72 A |
| 6,919,511 B1 * | 7/2005 | Tsunoda et al. | 174/72 A |

FOREIGN PATENT DOCUMENTS

JP 2001-354085 12/2001

* cited by examiner

Primary Examiner—Dean A. Reichard
Assistant Examiner—Adolfo Nino
(74) Attorney, Agent, or Firm—Armstrong, Kratz, Quintos, Hanson & Brooks, LLP

(57) ABSTRACT

Miniaturizing a protector receiving a wiring harness in height, and preventing sound noise caused by interference between a spring holder for holding the wiring harness and an inner surface of the protector, a continuous power supply device includes a wiring harness to be bent into a loop within a protector, a spring holder fixed at the loop of the wiring harness, a front end of a flat spring fixed at the spring holder to energize the loop to expand in radius, an elastic arm provided at the spring holder to be continuously and elastically in contact with inner surfaces of the protector.

20 Claims, 7 Drawing Sheets

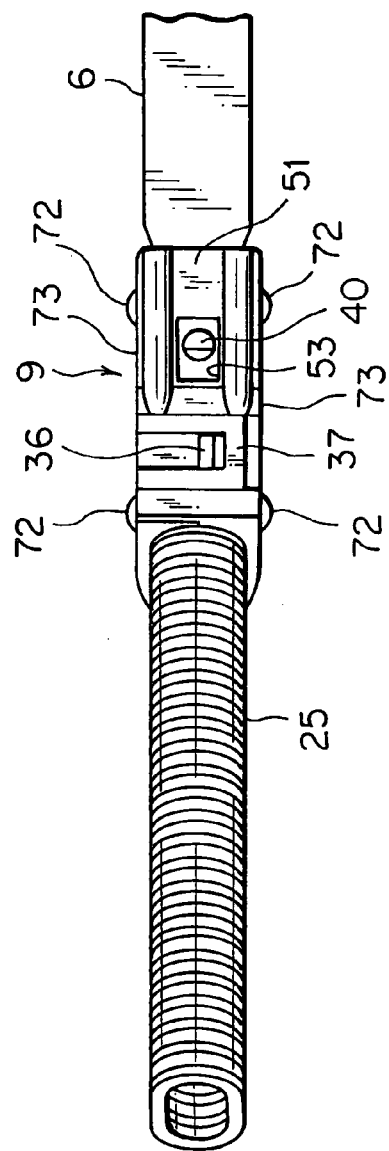
FIG. 4
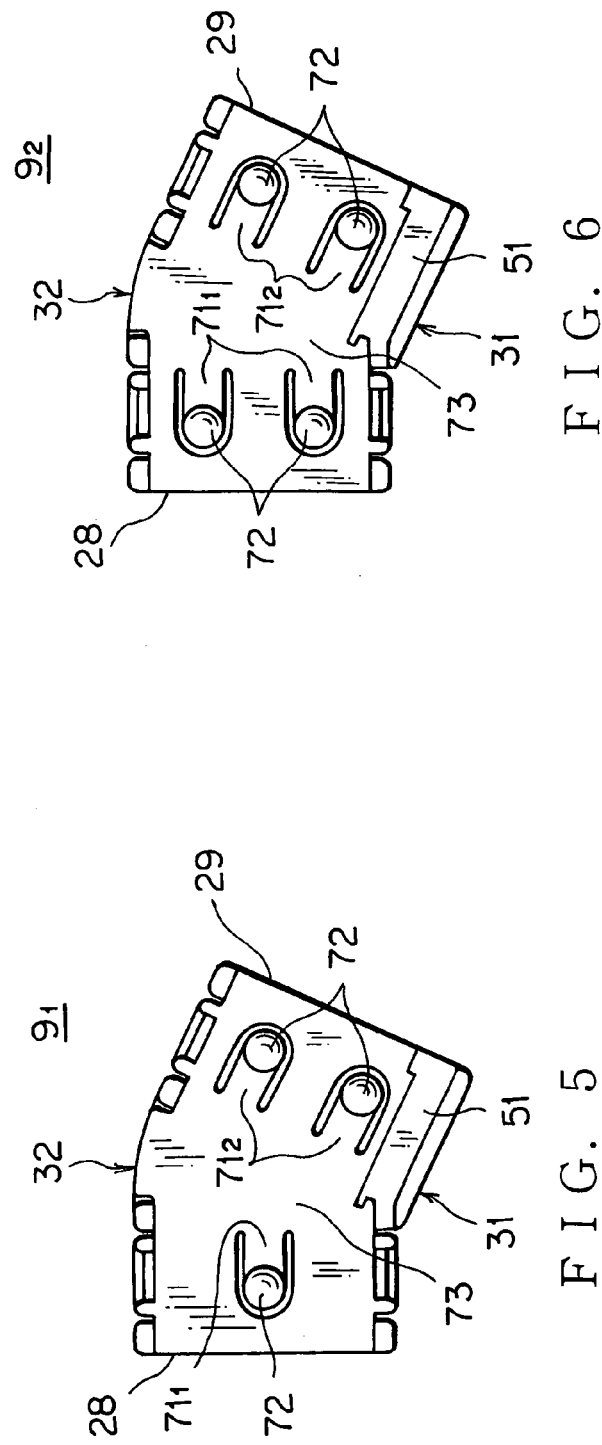
FIG. 5
FIG. 6

CONTINUOUS POWER SUPPLY DEVICE

The priority application Number Japan Patent Application 2004-371182 upon which this patent application is based is hereby incorporated by reference.

BACKGROUND OF THE INVENTION

1. Field of the Invention

This invention relates to a continuous power supply device in which a wiring harness is fixed with a holder having a flat spring in a protector so as to cancel an excessive length of the wiring harness by an energizing force of the flat spring.

2. Description of the Related Art

FIGS. 12, 13 shows a usual continuous power supply device (refer patent Reference 1).

A power supply device 50 is wired in a slide door 41 of a vehicle. The power supply device 50 includes a protector 42 made of synthetic resign for bendably receiving a wiring harness (showing only a base of the protector 42 and omitting a cover in a figure), and a metallic flat spring 44 for energizing the wiring harness 43 upwardly in the protector 42.

A bottom end of the flat spring 44 together with the wiring harness 43 is fixed at a bottom side of a front end of the protector 42, and a front end of the flat spring 44 supports the wiring harness 43 slidably. A cap 49 made of synthetic resin is mounted at a front end of the flat spring 44 for supporting the wiring harness 43 stably.

The wiring harness 43 is formed by covering a plurality of electric wires 43a with a corrugate tube 43b made of synthetic resin. A bottom portion of a front end of the corrugate tube 43b is fixed on the protector 42 by winding a tape around it. The corrugate tube 43b is good flexible by alternating a groove and a projected stripe.

One end of the electric wires 43a of the wiring harness 43 is led from a front side of the protector 42 to be connected with an auxiliary device in the slide door. The corrugate tube 43b at the other end of the wiring harness 43 is wired from a long bottom opening 45 of the protector 42 through a traversing space 46 to a vehicle body 47 to swing freely. The electric wires 43a in the wiring harness 43 between the traversing space 46 are protected safely from interference with outside, water drops and dust by the corrugate tube 43b.

FIG. 12 shows complete-closed condition of the slide door 41. FIG. 13 shows partly open condition of the slide door 41 nearing to full-open condition. When the slide door 41 is in the complete-closed condition, the wiring harness 43 is pulled rearwardly. When the slide door 41 is in the full-open condition, the wiring harness 43 is pulled forwardly. When the wiring harness is in the partly open condition, the wiring harness tends to droop downwardly, but slack (excessive length) thereof is canceled by energizing the wiring harness 43 upwardly with the flat spring 44. Thereby, bite caused by drooping is prevented.

Reference patent 1 is Japan Patent Application Laid Open No. 2001-354085.

SUMMARY OD THE INVENTION

Objects to be Solved

In the usual continuous power supply device 50, the protector 42 increases in an energizing direction of the flat spring, that is a direction of height in accordance with increase of the excessive length to be canceled. Thereby, freedom of laying the other parts to be installed in the slide door is limited. The spring cap 49 (harness supporting part) fixed at the flat spring 44 hits an inner surface of a vertical wall or an inner surface of the cover wall of the protector 42 and generates sound noise.

To overcome the above problem, an object of the present invention is to provide a continuous power supply device, which can make a protector lower height and prevent a harness holding member fixed on a flat spring from generating sound noise by interference with an inner wall of a protector.

How to Attain the Object of the Present Invention

In order to attain the object of the present invention, a continuous power supply device according to one aspect of the present invention is characterized in that a wiring harness is wired to have a loop formed by curving the wiring harness into a loop-shape within a protector, and that a spring holder is fixed at the loop of the wiring harness and has an elastic arm, and that a front end of a flat spring is fixed at the spring holder and the flat spring energizes the loop to increase a radius of the loop, and that the elastic arm is continuously and elastically in contact with an inner wall of the protector.

According to the above structure, the wiring harness is wired to have the loop in the protector, and slack (excessive length) of the wiring harness is cancelled by increasing a radius of the loop, and the wiring harness is led from the protector in accordance with decrease of the radius of the loop. The flat spring increases the radius of the loop. By forming the wiring harness into a loop shape in the protector and increasing/decreasing the radius of the loop, the protector can be miniaturized in a height direction. When the spring holder for holding a wiring harness is vibrated in a widthwise while the wiring harness is pulled out or returned into or a vehicle having a continuous power supply device is vibrated, the elastic arm is continuously and elastically in contact with the inner wall of the protector, so that a spring holder body other than the elastic arm does not abut on the inner wall of the protector and thereby generating sound noise is prevented.

The continuous power supply device is furthermore characterized in the continuous power supply device mentioned above in that the elastic arm has a projection on an outer surface at an front end thereof to be in contact with the inner wall of the protector.

According to the above structure, an outer surface of the projection of the front end of the elastic arm is in contact with the inner wall of the protector at a small area of point contact or line contact. Thereby, slide-contact between the projection and the inner wall of the protector is acted smoothly with small friction. The slide-contact of the projection is acted when the wiring harness is pulled out and returned into.

The continuous power supply device is still further characterized in the continuous power supply device mentioned above in that the elastic arm is formed by cutting a side wall of the spring holder partially into an arm shape.

According to the above structure, the elastic arm is deflected within a range of a wall thickness of a side wall of the spring holder or into an inside of the side wall of the spring holder when the elastic arm absorbs the vibration. Thereby, an occupied space by the elastic arm can be miniaturized. When providing the projection at the elastic arm, by projecting only the projection to an outside of the side wall of the spring holder, the space can be miniaturized.

The continuous power supply device is still further characterized in the continuous power supply device mentioned above in that the elastic arms are provided at both sides of the spring holder in a lateral direction and perpendicular to an inner wall of a base of the protector, to be respectively in contact with the inner wall of the base and an inner wall of a cover of the protector.

According to the above structure, the spring holder is supported stably in a center of widthwise of the protector by the elastic arms at the both sides thereof. Thereby, it is prevented that the both side walls of the spring holder and the both inner walls of the protector are in contact with each other, so that the spring holder can slide smoothly with low friction by only contact of elastic arms at the both sides and inner walls of the protector.

The continuous power supply device is still further characterized in the continuous power supply device mentioned above in that the elastic arms are provided symmetrically on mirror planes at the both sides of the spring holder.

According to the above structure, the spring holder can be supported stably without tilting in the protector by the elastic arms at the both sides of a position at the same height. Interference between the outer surface of the front end of the spring holder and the inner walls of the protector during the protector is vibrated is prevented. Absorption of vibration is improved also. When pulling or returning the wiring harness, the spring holder can slide securely on the inner walls of the protector only with the elastic arms. Thereby, rubbing of the spring holder body other than the elastic arms and the inner walls of the protector and increase of slide resistance thereby are prevented. More number of the elastic arms will improve function of preventing tilting of the protector, and also increase resistance against sliding. A suitable number of the elastic arms depends on a size of the spring holder, but usually 1–4 arms at one side are suitable.

The continuous power supply device is still further characterized in the continuous power supply device mentioned above in that the elastic arms are provided rotation symmetrically in a vertical direction at the both sides of the spring holder.

According to the above structure, when a gap between the spring holder and the inner walls of the protector is large, the vibration is absorbed by the elastic arm at lower portion of one side of the spring holder and the elastic arm at upper portion of the other side of the spring holder, and the spring holder slides along the both inner walls of the protector only by the elastic arms. When the gap between the spring holder and the inner walls of the protector is small, the spring holder rotates in a direction of tilting (rotates so as to make the upper portion of one side of the spring holder and the lower portion of the other side of the spring holder close to the inner walls of the protection). Thereby, allowable displacements (deflections) of the upper and lower elastic arms are ensured, and each elastic arm securely absorbs the vibration, so that the interference between the spring holder and the inner walls of the protector and the sound noise caused by the same are prevented. Since the allowable displacements (deflections) of the upper and lower elastic arms are ensured, a pushing force between each elastic arm and each inner wall of the protector is relaxed, and the slide resistance is reduced.

Effect of the Invention

According to the invention as mentioned above, by pulling and returning the wiring harness with the loop in the protector, the protector is miniaturized in the vertical direction. Thereby, freedom for layout of components mounted on the slide door of the vehicle is increased. When the spring holder is vibrated by vibration of the vehicle, the interference between the spring holder and the inner walls of the protector can be prevented by the elastic arms absorbing the vibration. Therefore, the sound noise is prevented and a high-commercial-value vehicle can be provided.

According to the invention, the elastic arm slides at the projection thereof on the inner walls of the protector with low friction, so that sliding motion of the spring holder, that is expansion/contraction of the loop of the wiring harness, can be acted smoothly by a small force, and operatability of the slide door and reliability of continuous power supplying are improved.

According to the invention, by receiving the elastic arms inside from the outer surface of the spring holder, a projecting amount of the elastic arm can be controlled to be small, so that the whole width of the spring holder can be miniaturized and the protector can be made thinner.

According to the invention, the interference between the both side walls of the spring holder and the both inner walls of the protector is prevented by the elastic arms at the both sides of the spring holder. The spring holder can slide smoothly at the elastic arms thereof on the both inner walls of the protector with low friction, so that slidability of the spring holder is improved, and operatability of opening/closing the slide door and reliability of continuous power supplying are more improved.

According to the invention, the spring holder is supported stably without tilting by the elastic arms at the both sides of the spring holder, so that absorbing efficiency of vibration (prevention efficiency of sound noise) is increased, and slidability of the spring holder is improved since sliding between an edge of the spring holder and the inner walls of the protector is prevented.

According to the invention, even if the gap between the spring holder and the inner walls of the protector is small, the spring holder rotates in the tilting direction, and amount of the displacement of each elastic arm is ensured. Thereby, each elastic arm securely absorbs the vibration and prevents the sound noise, and since the pushing force of each elastic arm is controlled to be small, and slide resistance is reduced, the spring holder can slide smoothly.

The above and other objects and features of this invention will become more apparent from the following description taken in conjunction with the accompanying drawings.

BRIEF DESCRIPTION OF THE DRAWINGS

FIG. 4 is a front view (viewing from a flat spring) showing a condition of an assembled spring holder shown in FIG. 3;

FIG. 5 is a front view of one modification of the spring holder;

FIG. 6 is a front view of the other modification of the spring holder;

DESCRIPTION OF THE PREFERRED EMBODIMENT

Figure 1:
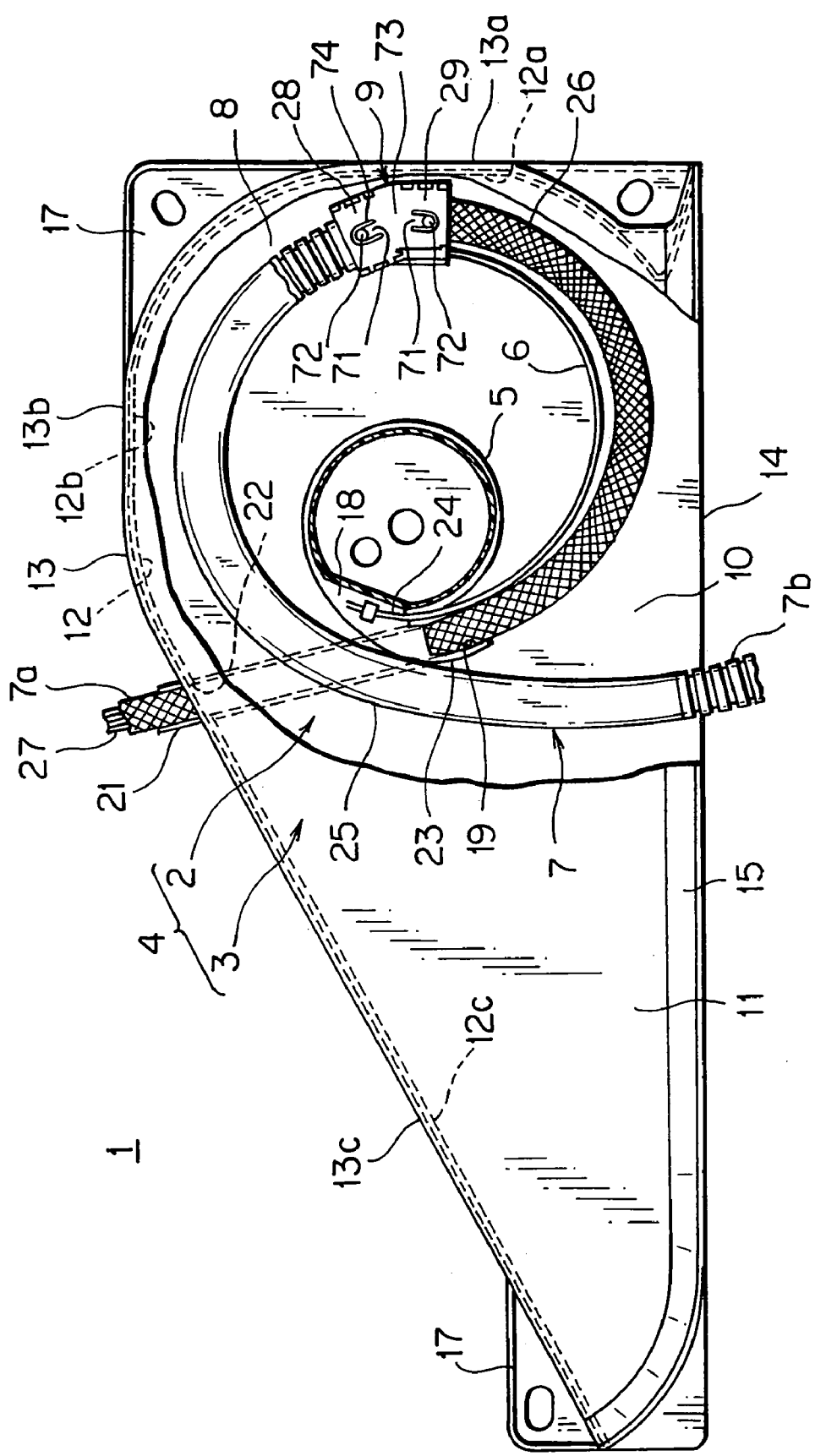
FIG. 1 is a partially sectional front view of a main area of an embodiment of a continuous power supply device according to the present invention.
Figure 2:
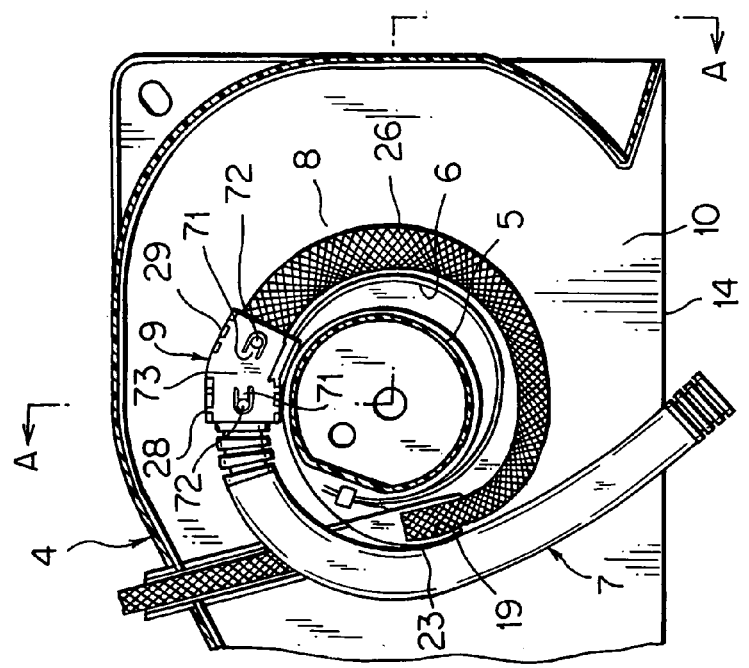
FIG. 2 is a front view showing a condition of a wiring harness shrunk in radius of the continuous power supply device shown in FIG. 1.

FIGS. 1, 2 show an embodiment of a continuous power supply device according to the present invention.

A continuous power supply device 1 includes a protector 4 having a base 2 made of synthetic resin and a cover 3, a metal flat spring 6 curved freely along an annular wall 5 inside the base 2, a wiring harness 7 wired outside the flat spring 6 to be bent in a loop shape along the annular wall 5 and a spring holder 9 made of synthetic resin, which is fixed at a front end of the flat spring 6, for holding the wiring harness 7 to connect and fix a protection tubes 25 and 26, which are outer covers of the wiring harness 7, with each other at a loop 8 of the wiring harness 7. The spring holder 9 includes elastic arms 71, which are continuously and elastically in contact with an inner wall of each base plate 10, 11 of the base 2 and the cover 3 of the protector 4, for preventing a sound noise. The power supply device 1 is usually installed in a slide door (not shown) of a vehicle.

The base 2 and the cover 3 of the protector 4 have a triangular or trapezoid vertical base plate 10, 11 and a narrow width surrounding wall 12, 13 perpendicular to the base plate 10, 11 at an upper side and a front/rear sides thereof. The surround wall 12, 13 has a substantially vertical front end wall 12a, 13a, a short horizontal top end wall 12b, 13b and a long slant rear wall 12c, 13c. By connecting the base 2 and the cover 3 together to overlap the surround wall 13 of the cover 3 on an outside of the surround wall 12 of the base 2, a long lower opening 14 for leading the wiring harness 7 is formed at a lower side of the protector 4.

Figure 12:
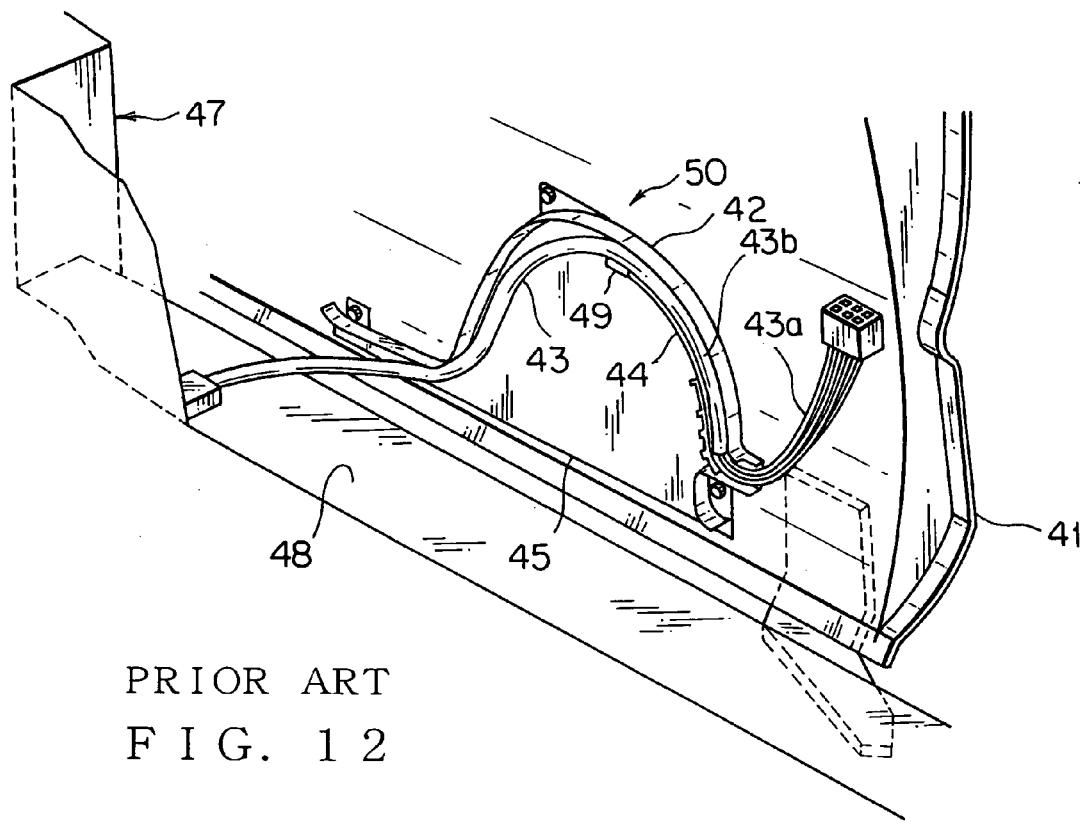
FIG. 12 is a perspective view of an embodiment of a continuous power supply device by prior art.
Figure 13:
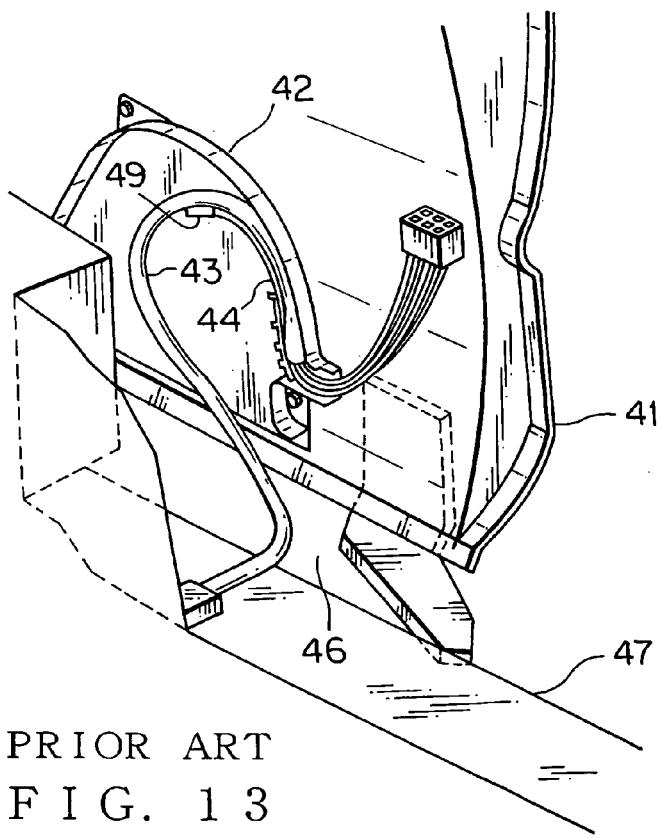
FIG. 13 is a perspective view showing an action of the continuous power supply device shown in FIG. 12.

A harness guide wall 15 with a curved shape in cross-section is formed to face outwardly at a side of the lower opening 14 of the cover 3. The cover 3 is provided at a center thereof with a projecting ring wall engaging with an inside of the annular wall 5 of the base 2. The protector 4 is designed to be lower on height than a usual protector (FIG. 12). It is realized by a structure receiving the wiring harness 7, which is curved into a small radius loop along the annular wall 5, in the protector 4. The protector 4 is fixed by a bracket 17, vertically in the slide door of the vehicle.

The annular wall 5 is formed integrally at the center of the base 2. A spring fixing portion 18 is provided integrally at a rear side of the annular wall 5. A harness leading groove 19 is provided at the base plate 10, adjacent to a rear of the spring fixing portion 18, and formed inside a drainpipe-like wall 21 extending upwardly. A cutout 22 for passing the wiring harness there through is formed at a position in which the surround wall 12 of the base 2 intersects the harness leading groove 19. A curved harness guide wall 23 is formed continuously from an upper side of the annular wall 5, adjacent to a rear of the harness leading groove 19. Therein, a front/rear direction of the power supply device corresponds to that of the vehicle.

A base end of the flat spring 6 is press-fitted into a slit 24 of the spring fixing portion 18. The flat spring 6 is provided to curve along the annular wall 5 with a restoring force to increasing a radius thereof, as shown in FIG. 2. The flat spring 6 is straight in unloaded condition and elastically curves for mounting in the protector 4.

The wiring harness 7 is wired in a loop shape outside the flat spring 6 along the annular wall 5. One end 7a of the wiring harness 7 is led upwardly from the leading groove 19. The wiring harness 7 is held in the drainpipe-like wall 21 and led into the slide door. The one end 7a of the wring harness 7 is connected with each auxiliary devices, such as a power regulated window unit, a door lock unit and a door mirror unit (not shown). The other end 7b of the wiring harness 7 is wired from the guide wall 23 through the lower opening 14 in the vehicle body. The wiring harness 7 can swing freely along the inner surface of the base plate 10 without interference with a part of the wiring harness 7 in the harness leading groove 19.

The spring holder 9 is fixed at the front end of the flat spring 6. The protection tube (corrugate tube) 25 as an outer cover of the wiring harness 7 is fixed at one end of the spring holder 9. The protection tube (mesh tube or braided tube) 26 as a outer cover of the wiring harness 7 is fixed at the other end of the spring holder 9. The meshed tube 26 is applied in a range from the leading grove 19 along the annular wall 5 to the spring holder 9. The corrugate tube 25 is applied in a range from the spring holder 9 through the lower opening 14 to the vehicle body. Thus, the mesh tube 26 and the corrugate tube 25 are connected with each other through the spring holder 9.

The mesh tube 26 is more flexible than the corrugate tube 25. The corrugate tube 25 is solider then the mesh tube 25, and has stiffness and waterproofness to protect electric wires in the wiring harness 7 safely from interference with outside and water. The corrugate tube 25 is provided with a groove and projected stripe alternately. The corrugate tube 25 in this embodiment is formed into an ellipse shape in a cross-section and arranged to be the cross section in lengthwise. Thus, the wiring harness 7 includes each protection tubes 25, 26 and a plurality of electric wires 27 received in the tubes.

The spring holder 9 can slide freely along an outer surface of the annular wall 5. The spring holder 9 is bent to form an L shape in a tangential direction of the annular wall 5. The spring holder 9 is provided respectively at a front half part and a rear half part thereof with an elastic arm 71 for preventing sound noise.

Figure 3:
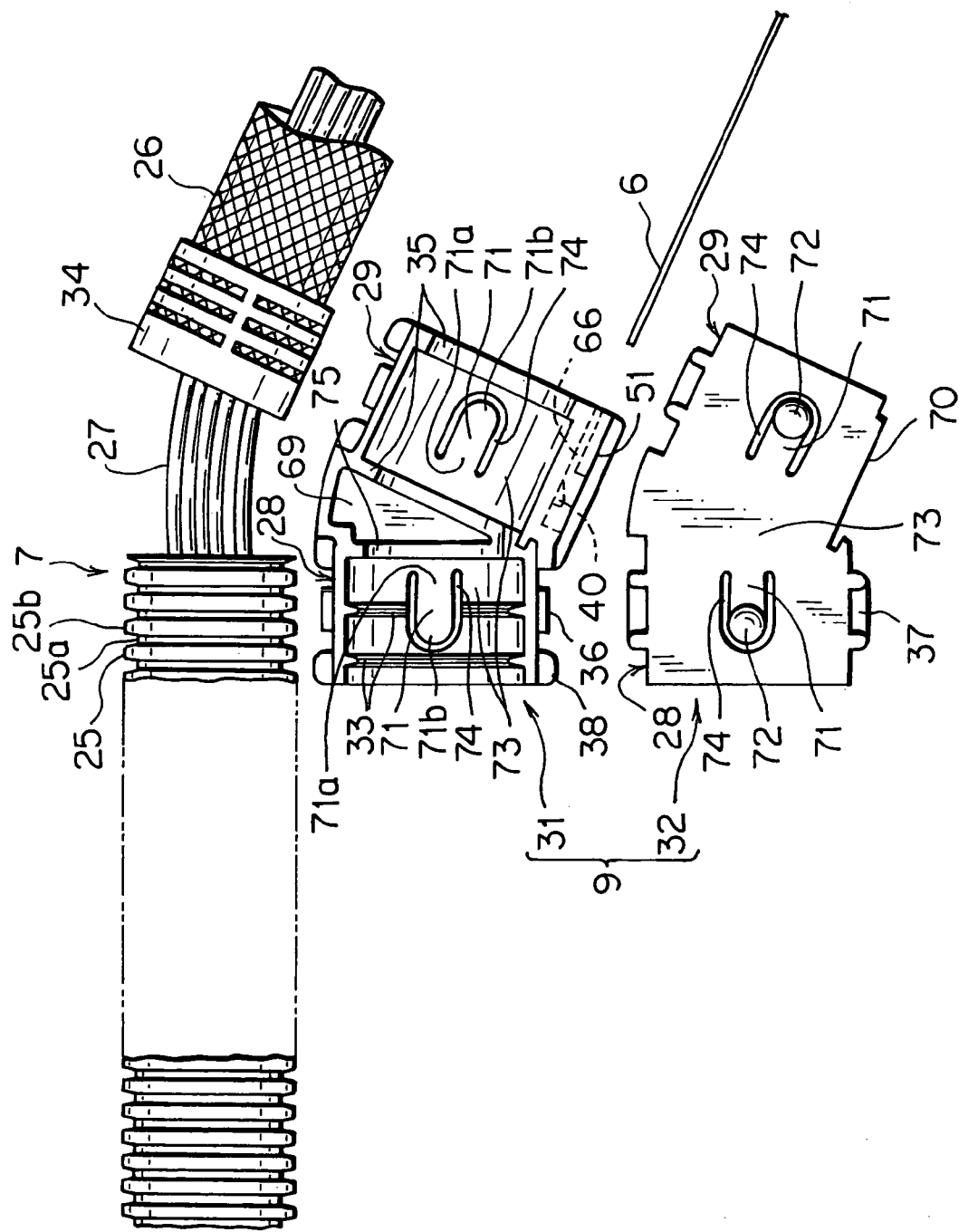
FIG. 3 is an exploded front view showing a condition before assembling a spring holder of the continues power supply device shown in FIG. 1.

Each elastic arm 71, as shown in FIG. 3, is formed inside a cutout slit 74 to be in the same plane of an outer surface of the side wall 73 by cutting out each side wall 73 of the front half part 28 and the rear half part 29 in a U-shape at the center of the spring holder 9 in a height direction. The elastic arm 71 at the front half part has the front end thereof facing front, and the elastic arm 71 at the rear half part has the front end thereof facing rear to be symmetric to each other. Herein, front half part is defined as a side extending from the front end of the flat spring 6.

Each elastic arm 71 has a semispherical projection 72 for pushing with contact on an outer surface of the front end thereof. The projection 72 projects outwardly from an outer surface of the side wall 73 of the spring holder 9. An arm body other than the projection 72 is located approximately in the same plane as the outer surface of the side wall 73. Each projection 72 is positioned in the center of the spring holder in the height direction thereof. Each projection 72 is continuously and elastically in contact with the inner surface of the base plate 10, 11 as each inner wall of the base 2 or the cover 3 of the protector 4 to prevent interference of the spring holder 9 and the protector 4. The arm body of the elastic arm 71 is not in contact with the inner surface of each base plate 10, 11.

Thus, the spring holder 9 has the front half part 28 for fixing the corrugate tube 25, the rear half part 29 for fixing the mesh tube 26, and provided with the elastic arms 71 at the both side walls 73 of the front and rear half parts 28, 29.

FIG. 2 shows the side door of a left side of the vehicle in a condition of full open. The slide door is moved rearwardly in the vehicle. The corrugate tube 25 of the wiring harness 7 is pulled from the lower opening 14 of the protector 4 forwardly (toward a side of fixing the wiring harness at the body of vehicle). A part of the mesh tube 26 and a part of the corrugate tube 25 continued to the spring holder 9 of the wiring harness 7 are shrunk in radius to make a loop 8 along the annular wall 5 and the guide wall 23. A bottom surface of the spring holder 9 slides along the outer surface of the annular wall 5. The flat spring 6 is shrunk in radius along the annular wall 5 to be mostly in contact with an inner surface of the mesh tube 26 of the hiring harness 7 into annular shape with the smallest radius.

In FIG. 2, an outward return force by a restoring force of the flat spring 6 acts on the spring holder 9. In a middle part in lengthwise of the flat spring 6, an expand force to expand the loop 8 of the wiring harness 7 outwardly is generated by the restoring force of the flat spring 6.

FIG. 1 shows the slide door in a condition of partial open. The corrugate tube 25 of the wiring harness 7 tends to droop largely between the body of the vehicle and the slide door. By the return force of the spring holder 9 by the flat spring 6 and the expand force by the flat spring 6, the loop 8 of the wiring harness 7 expands largely outside the annular wall 5 about a reference point of a gate of the harness leading groove 19. Thereby, the corrugate tube 25 of the wiring harness 7 is returned securely through the lower opening 14 into the protector 4, so that an excessive length is cancelled securely.

The front end of the flat spring 6 is fixed through the spring holder 9 on the each protection tubes 25, 26 at the loop 8 of the wiring harness 7. Thereby, an energizing force of the flat spring 6 acts directly on the protection tubes 25, 26 of the wiring harness 7, so that expanding/shrinking actions of the loop 8, especially expanding action by the energizing force of the flat spring 6, are performed securely without any slips, and the excessive length (slack or sag) of the wiring harness 7 is cancelled securely.

When the slide door is closed completely from the condition of FIG. 1, the slide door moves together with the power supply device 1 forwardly at the vehicle. The corrugate tube 25 of the wiring harness 7 is pulled rearwardly from the lower opening 14 of the protector 4 toward a harness fix member (not shown) of the body of the vehicle. The loop 8 of the wiring harness 7 is expanded in a slightly larger diameter than that of full-open of the slide door, but shrunk in diameter by that the flat spring 6 is pulled together with the loop 8. By moving the slide door, the corrugate tube 25 of the wiring harness 7 moves rearwardly in the lower opening 14.

When the slide door is opening from the complete closed condition, the condition in FIG. 1 is changed to the condition in FIG. 2 by actions opposite to that mentioned above. Actions of the flat spring 6, the spring holder 9 and wiring harness 7, performed during the process of opening the slide door, are similar as that performed during the above process of closing the slide door.

According to open/close operation of the slide door, the loop 8 of the wiring harness 7 expands in radius as mentioned above. Thereby, the spring holder 9 slides smoothly with low friction force by a small contact area between the projections 72 of the elastic arms 71 and the inner walls (inner surfaces of the base plates 10, 11) of the protector 4. The projections 72 are continuously and elastically in contact with the inner walls of the protector 4 without aparting therefrom. Thus, interference of the side walls 73 of the spring holder 9 and inner walls of the protector 4 is prevented and the sound noise generated by the interference can be prevented securely.

The interference between the spring holder 9 and the protector 4 is occurred not only by open/close operation of the slide door, but also by vibrations of an engine in the complete closed condition of the stopped vehicle and vibrations of the driving vehicle. In the both cases, even if the spring holder 9 is vibrated (moved) in widthwise of left/right direction, since the projections 72 of the elastic arms 71 are continuously and elastically in contact with the inner walls of the protector 4, the elastic arms 71 to be bent can absorb the vibration. Thereby, the interference between the spring holder 9 (spring holder body other than the elastic arms 71) and the inner walls of the protector 4 can be prevented securely.

FIG. 3 (exposed front view) shows an embodiment of the spring holder 9 and a structure for connecting the spring holder 9 and each protecting tube 25, 26 of the wiring harness 7 according to the continuous power supply device 1 of the present invention.

The spring holder 9 has a structure to be right/left separated to a holder base (separated holder) 31 and a holder cover (separated holder) 32, made of synthetic resin. The holder base 31 and the holder cover 32 are formed into almost symmetric half-annular shape or C-shape and L-shape by bending at the center thereof. The holder base 31 and the holder cover 32 respectively have the front half part 28 for the corrugate tube 25 of the wiring harness 7 and the rear half part 29 for the mesh tube 26 of the wiring harness 7.

Each front half part 28 has a plurality of projected stripes 33 (two stripes in this embodiment) engaging with the grooves 25*a* of the corrugate tube 25 at a front end and a middle portion thereof in parallel on an inner surface with a semi-ellipse cross section and a wide projected stripe 75 at a rear end thereof. A fan-shape space 69 is provided between the front half part 28 and the rear half part 29. The plurality of electric wires 27 to be exposed between the corrugate tube 25 and the mesh tube 26 of the wiring harness 7 are passed through the fan-shape space 69.

Each rear half part 29 has a pair of wide projected stripes 35 holding an insert member 34 of the mesh tube 26 inside thereof at a front end and a rear end of the rear half part 29 on an inner surface with a semi-ellipse cross section. An interval of the projected stripes 33 is equal to a value of multiplying N (integer number: 1, 2, 3 and others) and an interval of the grooves 25*a* of the corrugate tube 25. An interval of the projected stripe 35 is slightly larger than a length of the insert member 34. The groove 25*a* of the corrugate tube 25 is positioned between the projected stripes 25b adjacent to the both sides of groove 25a.

The insert member 34 of the mesh tube 26 is made of synthetic resin to have an ellipse cross section by molding to insert an end of the mesh tube 26 into the synthetic resin in a molding die. The end of the mesh tube 26 is fixed integrally with inside of the insert member 34.

The holder base 31 and the holder cover 32 are engaged and locked by a locking device, such as a locking projection 36 and a flexible engaging piece 37 to form a cylindrical member having an inner wall with an ellipse cross section and a rectangular outer wall. The locking member is applied not only by the locking projection 36 and the engaging piece 37, but also by a locking arm and an engaging recess (not shown).

In the front half part 28 of the holder base 31, the elastic arm 71 is arranged between each projected stripe 33, 75 at the front end and the rear end so as to traverse the projected stripe 33 at the middle portion of the front half part 28. A base end 71a of the elastic arm 71 is located at front side of the projected stripe 75 at the rear end. A front end 71b of the elastic arm 71 is located at slightly rear side of the projected stripe 33 at the front end. In the rear half part 29, the elastic arm 71 is arranged between each projected stripe 35 at the front and rear ends. A base end 71a of the elastic arm 71 is located at rear side of the projected stripe 35 at the front end. A front end 71b of the elastic arm 71 is located at front side of the projected stripe 33 at the rear end.

Lengthwise of each elastic arm 71 is perpendicular to lengthwise of the each projected stripe 33, 33. Each elastic arm 71 is formed by cutting out from the side wall 73 of the holder base 31 with the U-shape slit 74. The front end 71b of the elastic arm 71 is formed into a semicircular shape, and provided on an outer surface thereof integrally with the semispherical projection 72. The base end 71a of each elastic arm 71 is continued integrally to the side wall 73 of the holder base 31. Each elastic arm 71 can be elastically flexed freely in a direction of thickness of the arm about the base end 71a as a supporting point.

In the holder cover 32, the elastic arm 71 is provided similarly as the above holder base 31. Therefore, detailed description is omitted. Each elastic arm 71 of the holder base 31 and the holder cover 32 is provided to have the same shape symmetrically on a plane (at the same position in height).

A flat spring fixing portion 51 is provided integrally at a bottom side of the holder base 31. A bottom surface of the flat spring fixing portion 51 is a surface to be attached on the annular wall 5 of the protector 4. A bottom portion 70 of the rear half part 29 of the holder cover 32 is engaged together with the flat spring fixing portion 51. The flat spring fixing portion 51 is provided with a slit hole 66 for inserting and fixing the flat spring 6 and a circular lock projection 40 in the slit hole 66.

FIG. 4 is a plan view showing assembling condition of the spring holder 9. The projection 72 of each elastic arm 71 at the front/rear and right/left of the spring holder 9 projects outwardly from the outside surfaces of the right/left side walls 73 of the spring holder 9. In FIG. 4, marking 6 shows a flat spring, marking 53 shows a window formed on the bottom surface of the flat spring fixing portion 51. Marking 40 shows projection for locking the flat spring, marking 36 shows a lock projection of the spring holder 9. Marking 37 shows a engaging piece, and marking 25 is a corrugate tube.

Inserting the plurality of electric wires 27 through the corrugate tube 25 and the mesh tube 26, engaging the end of the corrugate tube 25 with the front half part 28 of the holder base 31, engaging the insert member 34 of the mesh tube 26 with the rear half part 29, and engaging the holder cover 32 with the holder base 31, the spring holder 9 is assembled into a unit. The corrugate tube 25 and the mesh tube 26 are easily connected together tightly against a pulling force through the spring holder 9.

In the above embodiment, the corrugate tube 25 and the mesh tube 26 are applied for the protection tube. Instead of the mesh tube 26, a corrugate tube or a flexible thin-wall vinyl tube (not shown) can be applied. Not applying the protection tube, the electric wires 27 can be wired in an exposure condition.

The corrugate tube 25 with the ellipse cross-section is for miniaturizing the protector 4 in thickness. When a space in thickness has more rooms, a corrugate tube with a round cross-section can be used. In this case, the inner wall of the spring holder 9 will be formed to have a round cross-section. The cross-section shape of the mesh tube 26 can be designed according to the cross-section shape of the corrugate tube 25 (to be as same as the cross-section shape of the corrugate tube 25).

In the above embodiment, the corrugate tube 25 and the mesh tube 26 are respectively fixed with the spring holder 9. The corrugate tube 25 and the mesh tube 26, those respective ends are overlapped, can be fixed by clamping them by the spring holder 9.

In the above power supply device 1, the protector 4 is installed vertically in the slide door. By installing the protector 4 horizontally in the body of the vehicle, the wiring harness 7 can be wired from the long lower opening 14 toward the slide door and from the harness leading groove 19 in the protector to the body of the vehicle. The above power supply device 1 can be applied for a slide seat in the vehicle or a slide door other than the vehicle.

In the above embodiment, the spring holder 9 is formed into an L-shape along the annular wall 5. When the length of the spring holder 9 is short, or the bending radius of the annular wall 5 is larger than that of the embodiment in FIG. 1, the spring holder 9, which is formed into a straight shape instead of the L-shape, can be used. In this case, the elastic arms 71 are arranged at a front area and a rear area on a line along lengthwise of the spring holder 9. When the minimum radius of the loop 8 is designed relatively large during closing/opening the slide door, the annular wall 5 can be removed, and the base end of the flat spring 6 can be fixed on a projecting wall 18 provided on the base plate 10 of the protector 4.

FIGS. 5, 6 show the other embodiments of a structure for arranging the elastic arms 71 of the spring holder 9.

In FIG. 5, one elastic arm $71_1$ is located in the center in a direction of height of a front half part of a spring holder 9', and two elastic arms $71_2$ are located at an upper area and a lower area of a rear half part of the spring holder 9'. FIG. 5 shows only holder cover 32. In the holder base 31 at a rear side of the holder cover, the same elastic arms $71_1$, $71_2$ are located at the same position as the holder cover 32. Number of the elastic arm 71 ($71_1$, $71_2$) is six by totaling three on one side surface and three of the other side surface of a spring holder $9_1$.

The elastic arm $71_1$ at the front half part is arranged in parallel to an upper edge and a lower edge of the front half part 28 of the spring holder $9_1$. The elastic arms $71_2$ at the rear half part are arranged in parallel to an upper edge and a lower edge of the rear half part 29 of the spring holder $9_1$. Shapes of each elastic arm 71 and the spring holder $9_1$ are the same as those in FIG. 3. Therefore, description of the projection 72, the flat spring fixing portion 51 and the others is omitted.

In FIG. 6, two elastic arms $71_1$ are arranged in parallel to each other at an upper area and a lower area of the front half part of the spring holder $9_2$ and two elastic arms $71_2$ are arranged in parallel to each other at an upper area and a lower area of the rear half part of the spring holder $9_2$. FIG. 6 shows only holder cover 32. In the holder base 31 at a rear side of the holder cover, the same elastic arms $71_1$, $71_2$ are located at the same position as the holder cover 32. Number of the elastic arm 71 ($71_1$, $71_2$) is eight by totaling four on one side surface and four of the other side surface of a spring holder $9_2$.

The elastic arms $71_1$ at the front half part are arranged in parallel to an upper edge and a lower edge of the front half part 28 of the spring holder $9_2$. The elastic arms $71_2$ at the rear half part are arranged in parallel to an upper edge and a lower edge of the rear half part 29 of the spring holder $9_2$. A crossing angle of center lines of the elastic arm $71_1$ at the front half part and the elastic arm $71_2$ at the rear half part is equal to a bending angle of the spring holder $9_2$. Shapes of each elastic arm 71 and the spring holder $9_2$ are the same as those in FIG. 3. Therefore, applying the same marking, detailed description is omitted.

Figure 7:
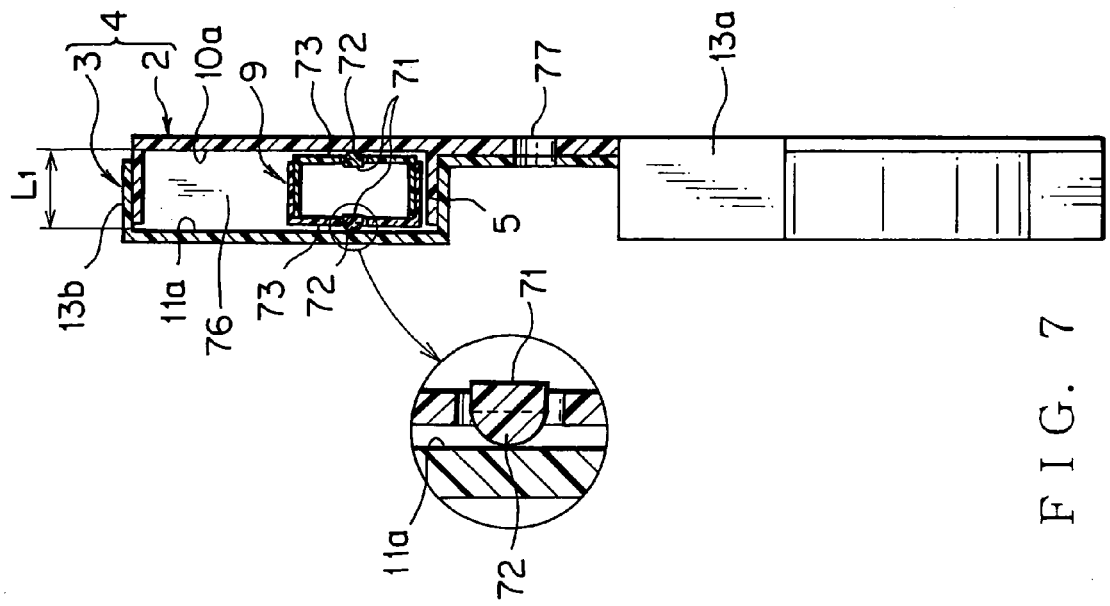
FIG. 7 is a cross-sectional view taken along line A—A in FIG. 2, showing a condition of contact between an elastic arm of the spring holder and a protector.
Figure 8:
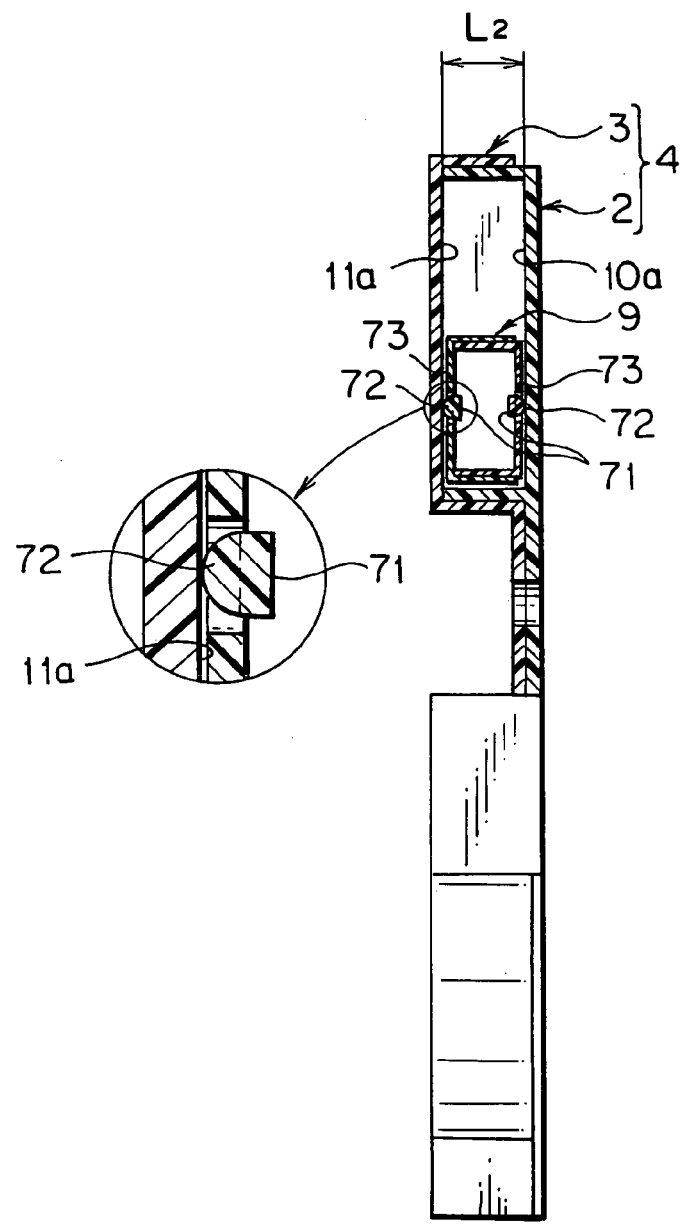
FIG. 8 is a cross-sectional view showing a condition of contact between the elastic arm of the spring holder and the protector when a gap between the spring holder and the protector is small.
Figure 9:
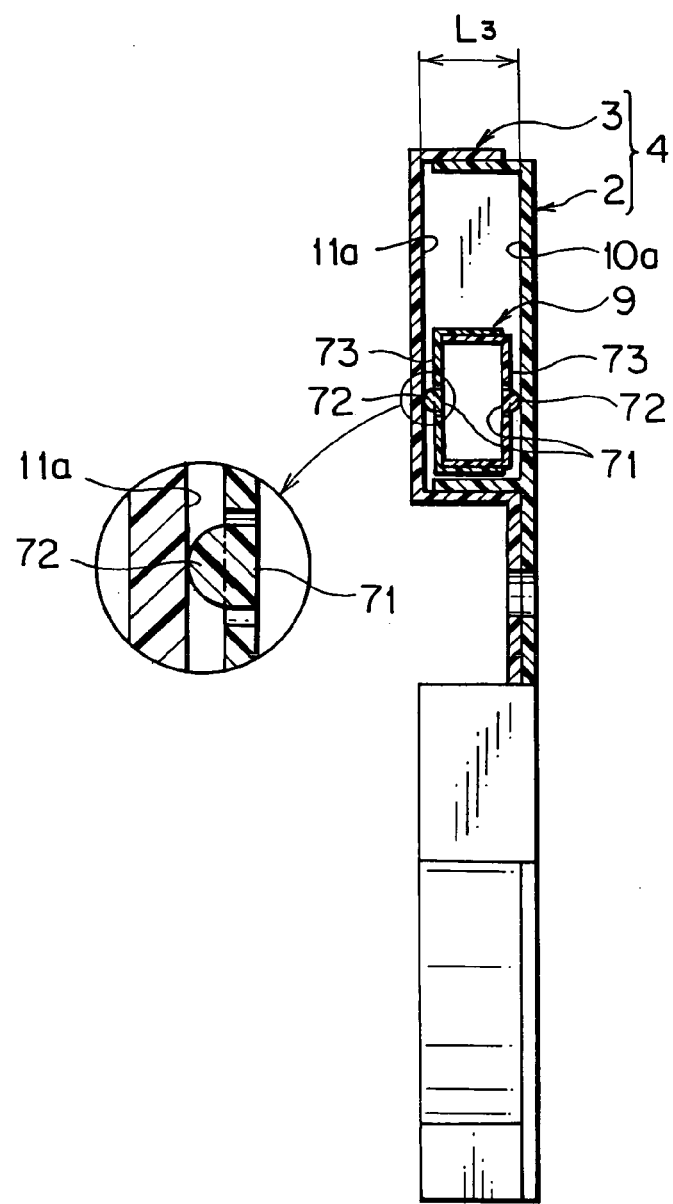
FIG. 9 is a cross-sectional view showing a condition of contact between the elastic arm of the spring holder and the protector when the gap between the spring holder and the protector is large.

FIGS. 7–9 show contact conditions between the projections 72 of the elastic arms 71 of the spring holder 9 and the inner surfaces 10a, 11a at a position of a cross section taken along the line A—A in FIG. 2, by comparing small and large sizes of gaps between the protector 4 and the spring holder 9.

FIG. 7 shows a projecting condition of the projection 72 of the elastic arm 71 when a distance $L_1$ between the inner surface 10a of the base 2 and the inner surface 11a of the cover 3 of the protector 4 is equal to a value with a middle design tolerance of the outer width between the both side walls 73 of the spring holder 9, that is when the gap between the inner surface 10a, 11a of the protector 4 and the both side walls 73 of the spring holder 9 is in a middle value.

Each projection 72 of the elastic arm 71 is pushed slightly into the spring holder 9 together with the elastic arm 71 by each inner surface 10a, 11a of the protector 4 (the elastic arm 71 is slightly bent inwardly). The spring holder 9 is in contact with the inner surfaces 10a, 11a of the protector 4, only at the projections 72 of the elastic arms 71.

When the protector 4 or the spring holder 9 receives force by vibration in a traverse direction in the above condition, the elastic arms 71 receives the vibration and controls the vibration of the spring holder 9. Thereby, interference between the spring holder 9 and the inner surfaces 10a, 11a of the protector 4 is prevented. When the protector 4 receives strong vibration in the traverse direction, the elastic arms 71 are bent inwardly to absorb the vibration. Thereby, interference (hitting) between the spring holder 9 (the spring holder body other than the elastic arms 71) and the inner surfaces 10a, 11a of the protector 4 is prevented. When the spring holder 9 is vibrated by stronger vibration in the traverse direction, since the elastic arms 71 support the spring holder 9 elastically against the inner surfaces 10a, 11a of the protector 4, the spring holder 9 does not interfere impulsively with the inner surfaces 10a, 11a of the protector 4, and sound noise is not generated.

In FIG. 7, marking 76 shows a harness passing space in the protector 4, marking 5 shows an annular wall, marking 77 shows a hole for fixing the protector 9, and markings 13a, 13b show respective outer walls of the protector. This structure is the same as that in FIGS. 8–11.

FIG. 8 shows a projecting condition of the projection 72 of the elastic arm 71 when a distance $L_2$ between the inner surface 10a of the base 2 and the inner surface 11a of the cover 3 of the protector 4 at the position of a cross section taken along the line A—A in FIG. 2 is in a value with a negative design tolerance of the outer width between the both side walls 73 of the spring holder 9, that is when the gap between the inner surface 10a, 11a of the protector 4 and the both side walls 73 of the spring holder 9 is in a small value.

Each projection 72 of the elastic arm 71 is strongly pushed deeply into the spring holder 9 together with the elastic arm 71 by each inner surface 10a, 11a of the protector 4 (the elastic arm 71 is large bent inwardly). The spring holder 9 is in contact with the inner surfaces 10a, 11a of the protector 4, only at the projections 72 of the elastic arms 71. When a part (the side wall 73) of the spring holder 9 abuts on the inner surfaces 10a, 11a of the protector 4, since the projections 72 are continuously and elastically in contact with the inner surfaces 10a, 11a of the protector 4, the spring holder 9 does not interfere impulsively with the inner surfaces 10a, 11a of the protector 4, and sound noise is not generated.

FIG. 9 shows a projecting condition of the projection 72 of the elastic arm 71 when a distance $L_3$ between the inner surface 10a of the base 2 and the inner surface 11a of the cover 3 of the protector 4 at the position of a cross section taken along the line A—A in FIG. 2 is in a value with a positive design tolerance of the outer width between the both side walls 73 of the spring holder 9, that is when the gap between the inner surface 10a, 11a of the protector 4 and the both side walls 73 of the spring holder 9 is in a large value.

Each elastic arm 71 is almost not bent inwardly, and the projection 72 projects large outwardly to be continuously and elastically in contact with each inner surface 10a, 11a of the protector 4. When the protector 4 or the spring holder 9 receives force by vibration in a traverse direction in the above condition, since the elastic arms 71 are large bent inwardly to absorb the vibration, interference between the spring holder and the inner surfaces 10a, 11a of the protector 4 and generating sound noise are prevented.

Figure 10:
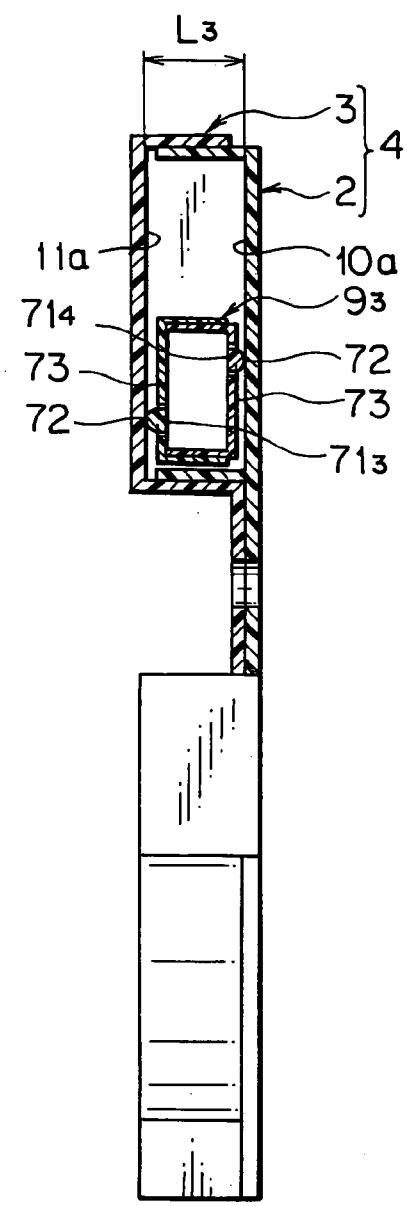
FIG. 10 is a cross-sectional view showing a condition of contact between the elastic arm of the spring holder and the protector when the modified spring holder is applied.
Figure 11:
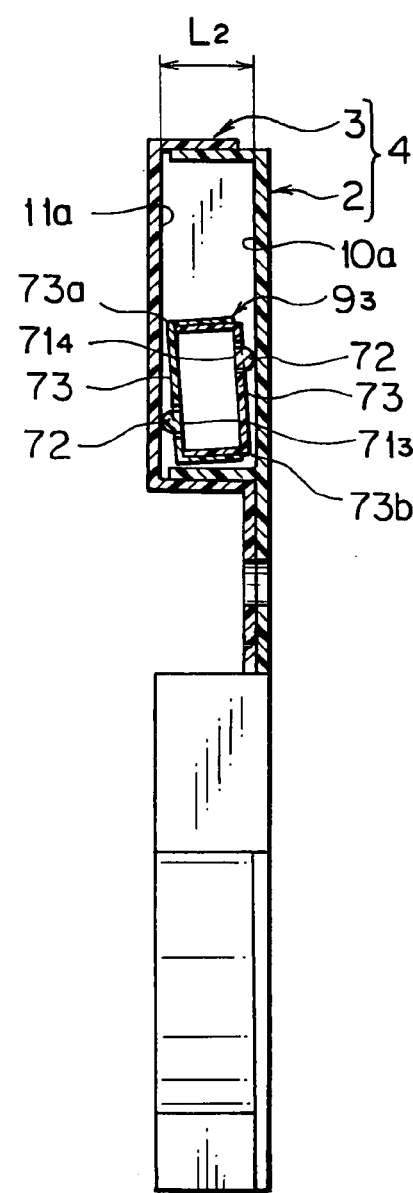
FIG. 11 is a cross-sectional view showing a condition of contact between the elastic arm of the spring holder and the protector when the gap between the other modified spring holder and the protector is small.

Deferring from the examples in FIGS. 7–9, in FIGS. 10, 11, an elastic arm $71_3$ at one side wall 73 and an elastic arm $71_4$ at the other side wall 73 of the spring holder $9_3$ are arranged on one diagonal line. For example, the elastic arm $71_3$ is arranged at a lower area of one side wall 73 and the elastic arm $71_4$ is arranged at a upper area of the other side wall 73. Describing the spring holder 9 in FIG. 6, a pair of elastic arms $71_1$, $71_2$ is arranged at each lower area of the front half part and the rear half part of the one side wall 73 of the spring holder $9_2$. A pair of elastic arms $71_1$, $71_2$ is arranged at each upper area of the front half part and the rear half part of the other side wall 73 of the spring holder $9_2$.

FIG. 10 shows a projecting condition of the projection 72 of each elastic arm $71_3$, $71_4$ when a distance $L_3$ between the inner surface 10a of the base 2 and the inner surface 11a of the cover 3 of the protector 4 is in a value with a positive design tolerance of the outer width between the both side walls 73 of the spring holder $9_3$, that is when the gap between the inner surface 10a, 11a of the protector 4 and the both side walls 73 of the spring holder $9_3$ is in a large value, similarly as FIG. 9. A shape of each elastic arm $71_3$, $71_4$ is the same as that of the aforesaid elastic arm 71.

The spring holder $9_3$ is supported without tilting by the projection 72 of the elastic arm $71_3$ at the lower area of the one side wall 73 and the projection 72 of the elastic arm $71_4$ at the upper area of the other side wall 73 elastically in contact with the inner walls 10a, 11a of the protector 4. When the protector 4 or the spring holder $9_3$ receives force by vibration in a traverse direction, one elastic arm ($71_3$ or $71_4$) pushed to one inner surface (10a or 11a) is bent inwardly to absorb the vibration similarly as FIG. 9, so that interference between the spring holder $9_3$ and the inner surfaces 10a, 11a of the protector 4 is prevented.

FIG. 11 shows a projecting condition of the spring holder $9_3$ when a distance $L_2$ between the inner surface 10a of the base 2 and the inner surface 11a of the cover 3 of the protector 4 is in a value with a negative design tolerance of the outer width between the both side walls 73 of the spring holder $9_3$ similarly as FIG. 8, that is when the gap between the inner surface 10a, 11a of the protector 4 and the both side walls 73 of the spring holder $9_3$ is in a small value.

The spring holder $9_3$ in a normal condition is tilted (rotated) in the traverse direction. The projection 72 of the elastic arm 71 at the lower area of the one side wall 73 and the projection 72 of the elastic arm 71 at the upper area of the other side wall 73 are respectively in contact with the inner surfaces 10a, 11a of the protector 4. In this case, it is no concern that an upper edge 73a of the one side wall 73 and a lower edge 73b of the other side wall 73 of the spring holder $9_3$ are respectively in contact with the inner surfaces 10a, 11a of the protector 4.

When the protector 4 or the spring holder $9_3$ receives force by vibration in a traverse direction, one elastic arm ($71_3$ or $71_4$) pushed to one inner surface (10a or 11a) is bent inwardly to absorb the vibration, and the spring holder $9_3$ is not tilted and stands vertically so as to be at the projections 72 of the right/left elastic arms 71, 71 at a point in contact with the inner surfaces 10a, 11a of the protector 4. Thereby, interference between the spring holder $9_3$ and the inner surfaces 10a, 11a of the protector 4 and the sound noise caused by that are prevented.

In the spring holder 9 of each above embodiment, the arm body (part other than the projection 72) of the elastic arm 71 in the unload condition is arranged in the same plane as the side wall 73 of the spring holder 9. By forming the elastic arm 71 into a L shape, extending a slant portion (not shown) at the base end of the elastic arm outwardly from the side wall 73 of the spring holder 9, arranging a straight portion (not shown) of the elastic arm continued to the slant portion in parallel to the side wall 73 so as to project the straight portion outwardly from the side wall 73 of the spring holder 9, forming the straight portion to be short instead of providing the projection 72 for contacting/pushing at a front end of the straight portion, it can make the whole straight portion elastically in contact with the inner surfaces 10a, 11a of the protector 4. In this case, the spring holder 9 increases slightly with an amount of projecting the elastic arm outwardly in widthwise thereof. Alternatively, amount of bending the elastic arm inwardly and the spring force can be given, and it can accept larger vibration than that in the above examples.

Each above elastic arm 71 is formed by cutting out the side wall 73 of the spring holder 9 in an arm shape. The elastic arm can be formed by projecting it outwardly from the outer surface of the side wall 73 as the base end. However, in this case, the width in the traverse direction of the spring holder including the elastic arm will increase.

In the above embodiments, the elastic arms 71 are arranged at the both sides in the widthwise of the spring holder 9. By providing large elastic arms (not shown) only at one side wall 73, it is possible to make the other side wall 73 of the spring holder continuously in contact with the inner surface (10a or 11a) of the protector 4 by a pushing force of the elastic arm. In this case, contact area is increased, and slide resistance of the spring holder will be increased.

In the above embodiments, each elastic arm 71 is provided at the front/rear half parts of the spring holder 9. When the spring holder 9 is short in whole length, one elastic arm 71 can be provided at both sides of the spring holder, a pair of elastic arms 71 at the both side of the spring holder can be provided at upper/lower areas of the spring holder in parallel, and the pair of elastic arms 71 at upper/lower area can be arranged in opposite directions to each other (the projections 72 are provided at front half and rear half parts).

The shape of the projection 72 of the elastic arm 71 is not limited semispherical, but pyramidal, rectangular or semicircular in cross-section.

What is claimed is:

1. A continuous power supply device comprising:
   a protector;
   a wiring harness having a loop being wired by curving said wiring harness into a loop-shape within the protector;
   a spring holder being fixed at said loop of the wiring harness and having an elastic arm; and
   a flat spring, a front end of which is fixed at the spring holder, energizing the loop for increasing a radius of the loop,
   whereby the elastic arm is continuously and elastically in contact with an inner wall of the protector.

2. The continuous power supply device according to claim 1, wherein the elastic arm has a projection on an outer surface at an front end thereof to be in contact with the inner wall of the protector.

3. The continuous power supply device according to claim 2, wherein the elastic arm is formed by cutting a side wall of the spring holder partially into an arm shape.

4. The continuous power supply device according to claim 2, wherein the elastic arms are provided at both sides of the spring holder in a lateral direction and perpendicular to an inner wall of a base of the protector, to be respectively in contact with the inner wall of the base and an inner wall of a cover of the protector.

5. The continuous power supply device according to claim 2, wherein the elastic arms are provided symmetrically on mirror planes at the both sides of the spring holder.

6. The continuous power supply device according to claim 2, wherein the elastic arms are provided rotation symmetrically in a vertical direction at the both sides of the spring holder.

7. The continuous power supply device according to claim 3, wherein the elastic arms are provided at both sides of the spring holder in a lateral direction and perpendicular to an inner wall of a base of the protector, to be respectively in contact with the inner wall of the base and an inner wall of a cover of the protector.

8. The continuous power supply device according to claim 3, wherein the elastic arms are provided symmetrically on mirror planes at the both sides of the spring holder.

9. The continuous power supply device according to claim 7, wherein the elastic arms are provided symmetrically on mirror planes at the both sides of the spring holder.

10. The continuous power supply device according to claim 1, wherein the elastic arm is formed by cutting a side wall of the spring holder partially into an arm shape.

11. The continuous power supply device according to claim 10, wherein the elastic arms are provided at both sides of the spring holder in a lateral direction and perpendicular to an inner wall of a base of the protector, to be respectively in contact with the inner wall of the base and an inner wall of a cover of the protector.

12. The continuous power supply device according to claim 10, wherein the elastic arms are provided symmetrically on mirror planes at the both sides of the spring holder.

13. The continuous power supply device according to claim 10, wherein the elastic arms are provided rotation symmetrically in a vertical direction at the both sides of the spring holder.

14. The continuous power supply device according to claim 11, wherein the elastic arms are provided symmetrically on mirror planes at the both sides of the spring holder.

15. The continuous power supply device according to claim 11, wherein the elastic arms are provided rotation symmetrically in a vertical direction at the both sides of the spring holder.

16. The continuous power supply device according to claim 1, wherein the elastic arms are provided at both sides of the spring holder in a lateral direction and perpendicular to an inner wall of a base of the protector, to be respectively in contact with the inner wall of the base and an inner wall of a cover of the protector.

17. The continuous power supply device according to claim 16, wherein the elastic arms are provided symmetrically on mirror planes at the both sides of the spring holder.

18. The continuous power supply device according to claim 16, wherein the elastic arms are provided rotation symmetrically in a vertical direction at the both sides of the spring holder.

19. The continuous power supply device according to claim 1, wherein the elastic arms are provided symmetrically on mirror planes at the both sides of the spring holder.

20. The continuous power supply device according to claim 1, wherein the elastic arms are provided rotation symmetrically in a vertical direction at the both sides of the spring holder.

* * * * *